United States Patent [19]
Francis et al.

[11] Patent Number: 5,439,518
[45] Date of Patent: Aug. 8, 1995

[54] FLYASH-BASED COMPOSITIONS

[75] Inventors: Hubert C. Francis, Lithonia; Anne H. Ksionzyk, Decatur, both of Ga.

[73] Assignee: Georgia-Pacific Corporation, Atlanta, Ga.

[21] Appl. No.: 1,295

[22] Filed: Jan. 6, 1993

[51] Int. Cl.$^6$ .......................................... C04B 18/06
[52] U.S. Cl. .................... 106/705; 106/778; 106/783; 106/785; 106/DIG. 1
[58] Field of Search ............... 106/705, 706, 715, 745, 106/773, 774, 763, 778, 783, 785, DIG. 1, 405, 461; 501/155; 264/DIG. 49; C04B 18/06

[56] References Cited

U.S. PATENT DOCUMENTS

| | | |
|---|---|---|
| 2,516,342 | 7/1950 | Randall et al. . |
| 2,785,988 | 3/1957 | Lipkind et al. . |
| 3,068,109 | 12/1962 | Rodeffer . |
| 3,232,777 | 2/1966 | Bush . |
| 3,520,708 | 7/1970 | Chambers ........................ 106/785 |
| 4,018,963 | 4/1977 | Fuji et al. ........................ 106/705 |
| 4,081,283 | 3/1978 | Lankard et al. ............... 106/DIG. 1 |
| 4,240,952 | 12/1980 | Hulbert, Jr. et al. . |
| 4,318,744 | 3/1982 | Dodson . |
| 4,353,749 | 10/1982 | Ray et al. ..................... 106/DIG. 1 |
| 4,403,006 | 9/1983 | Bruce et al. . |
| 4,453,978 | 6/1984 | Okimura et al. ............... 106/DIG. 1 |
| 4,464,200 | 8/1984 | Duval . |
| 4,504,320 | 3/1985 | Rizer et al. . |
| 4,615,809 | 10/1986 | King ............................. 106/DIG. 1 |
| 4,661,159 | 4/1987 | Ortega et al. . |
| 4,902,347 | 2/1990 | Soroushian et al. . |

FOREIGN PATENT DOCUMENTS

| | | |
|---|---|---|
| 0124534 | 10/1978 | Japan ..................... 106/785 |
| 0141818 | 11/1979 | Japan . |
| WO93/04007 | 3/1993 | WIPO . |

OTHER PUBLICATIONS

Japanese Patent Abstracts—"Cement Admixture and Cement Composition Containing the Same" Doi et al. JP 0042640 (Apr. 10, 1992).

Fly Ash Facts for Highway Engineers (U.S. Dept. of Transportation) FHA Jul. 1986 p. 6.

Xu, Aimin, and Sarkar, Shondeep L., "Microstructural Study of Gypsum Activated Fly Ash Hydration in Cement Paste" (Cement and Concrete Research, vol. 21, pp. 1137–1147, (1991).

Gera et al., "Utilization of Ash and Gypsum Produced by Coal Burning Power Plants", *Waste Materials in Construction*, pp. 433–440 (1991) no month.

Mailvaganam, "Concreting with Chemical Admixtures", *The Construction Specifier*, pp. 106–114 (Jul., 1993).

Holley, "Ash Utilization and Disposal", *Clean Energy from Waste and Coal*, (1993) no month.

Holley, "Ash Utilization and Disposal", *Clean Energy from Waste and Coal*, pp. 242–252 (1993) no month.

Singh et al., "Microstructure of Glass Fibre Reinforced Water Resistant Gypsum Binder Composites", *Cement and Concrete Research*, vol. 23, pp. 213–220 (1993) no month.

*Primary Examiner*—Mark L. Bell
*Assistant Examiner*—Paul Marcantoni
*Attorney, Agent, or Firm*—Synnestvedt & Lechner

[57] ABSTRACT

Binder compositions are provided which are principally composed of a lime-containing flyash, and optionally hydratable gypsum, with a small amount of a property improving additive. The compositions are capable of setting when mixed with sufficient water to form a hardened material having a high degree of compressive strength after only about 1 hour following set. In selected embodiments, compositions are provided for floor underlayment, road patch and exterior statuary applications. Compressive strengths starting at about 600 psi can be achieved within 1 hour after set with adequate working time for construction applications.

28 Claims, No Drawings

FLYASH-BASED COMPOSITIONS

FIELD OF THE INVENTION

This invention relates to settable mixtures containing flyash, and especially, quick-setting flyash-containing and flyash-based mixtures which develop high compressive strength.

BACKGROUND OF THE INVENTION

Flyash is a waste material, normally recovered by coal-burning furnaces. It is composed mostly of metal oxides, such as silica, alumina, iron oxide, and magnesium oxide, together with unburned carbon resulting from the combustion of coal. Flyash is believed to be one of many pozzolanic materials, such as volcanic ashes and diatomaceous earths, which react with lime (CaO) in the presence of water to produce a hard cementitious compound at ambient temperatures. In fact, certain classes of flyash, which are the by-product of western lignite coal power plants, are known to contain up to about 30% CaO. This type of flyash has been designated as a Class C artificial pozzolan as recognized by the ASTM C-618 standard. There is also a Class F flyash, which contains less than about 6% CaO, and hence, is rather inert, with little or no binding ability.

Flyash has been employed in such diverse applications as in the stabilization of sludge, U.S. Pat. No. 4,615,809, in the improvement of the flow and strength characteristics of concrete, see U.S. Pat. Nos. 4,240,952 and 4,318,744, and more recently in the preparation of cementitious floor underlayments, see U.S. Pat. No. 4,661,159, all of which are hereby incorporated by reference. As these patents illustrate, flyash has been most often used as a minor ingredient in cement mixtures due to its low green strength and extremely quick-setting ability. As a consequence, flyash has been lagging behind cement in the number of commercial applications, and the properties and chemistry of flyash have not been completely understood.

Unfortunately, the commercial leader of binders, cement, has not been completely satisfactory. Cement tends to shrink during setting, and, after weathering, often develops large gaping cracks. Cement must also contain large quantities of aggregates, such as gravel, when disposed in thicknesses greater than about 1 inch. Finally, cement-based binders require about 24 hours to set; a factor that most contractors anticipate, but which has nevertheless resulted in significant and costly completion delays.

SUMMARY OF THE INVENTION

The present invention provides flyash-containing and flyash-based binder compositions made from a lime-containing flyash. The flyash contains a setting retarder for permitting sufficient amounts of working time to be suitable for construction use. Optionally, the composition can include hydratable gypsum, such as calcium sulfate hemihydrate, for applications requiring a higher green strength at the expense of some weathering ability.

Accordingly, a satisfactory cementitious composition is provided by this invention which demonstrates clearly defined benefits over prior art Portland cement-based compositions. These compositions expand slightly and do not significantly shrink or crack like cement. A poured slab of this material, mixed with sand and water, can be applied in thicknesses greater than 3 inches without gravel aggregate. There is also no need for chemical stripping, acid etching, or sand blasting of the substrate in using these preparations, as in the case of cement, since the claimed compositions have great bonding ability to almost any surface, and do not shrink. This elimination of the surface preparation step alone can save the average contractor about $0.35–$1.00 per sq. ft. in 1992 dollars. The flyash-containing binders of this invention are also much less sensitive to hot and cold weather conditions and water-to-binder ratios than cement, and consequently, are much more versatile and user-friendly.

The settable compositions described herein are ideally suited for retrofitting-renovations of all types of concrete floors. They can be used for filling duck ponds, leveling floors with deep fill to feather edge applications, enclosing VCT, VAC, or asbestos, capping cracked light-weight cement, topping old ceramic, marble, or terrazzo floors, resurfacing old concrete floors for carpet or vinyl, patching roads, manufacturing statuary, firedoor cores, sheathing, and numerous other applications.

The cementitious combination of ingredients employed by this invention preferably contain about 90–99.9 wt.% of a lime-containing flyash and about 0.1–10 wt.% pigment, dispersant, cement, filler, and/or setting retarder when used for statuary and balcony repair. After mixing with water and setting, this composition has a green compressive strength of at least about 600 psi about 1 hour after set, as well as a cementitious appearance, i.e., off-grey to off-white.

For the floor underlayment market, the desired combination of ingredients includes about 10–89 wt.% of a lime-containing flyash, about 10–89 wt.% hydratable gypsum, and at least about 0.05 wt.% of an additive selected from: a setting retarder, dispersant, and/or pigment. This combination of ingredients, when combined with sufficient water, sets to have a green compressive strength of at least about 1,000 psi after about 1 hour after set.

In a further embodiment of this invention, a road patch formulation is provided which includes about 40–89 wt.% of a lime-containing flyash, about 10–59 wt.% hydratable gypsum, and at least about 0.05 wt.% of an additive selected from: a setting retarder, dispersant, and/or pigment. This composition also has a green compressive strength of at least about 1,000 psi after about 1 hour after set.

DETAILED DESCRIPTION OF THE INVENTION

The aforesaid binder compositions disclosed within the context of summarizing this invention significantly improve the state-of-the-art demonstrated by cement-based products. As used herein, the term "cementitious" refers to the ability of the claimed compositions to produce pozzolanic reactions. Such reactions are known to be very slow, in that the pozzolan, such as flyash, increases in compressive strength by aging after setting until the material reaches 28 to 90 days, or better. Although the resulting "aged" strength of a pozzolan reaction requires a certain amount of patience, compressive strengths often exceeding those for some cement-based compositions can be achieved without significant shrinkage or cracking. This is a tremendous value in floor underlayment, road patching, and other exterior applications.

Flyash is essential to the final properties of the set compositions of this invention. Flyash is a by-product of coal usage in power plants and is known to be composed of many fine ash particles ranging in size from about 1 to 100 microns. The flyash ingredient of this invention preferably contains lime (CaO) in amounts ranging from about 6 to about 35 wt.%, and more preferably, falls within the chemical parameters set forth in ASTM C-618, which is hereby incorporated by reference. The binder compositions of this invention, depending upon their end use, contain flyash in amounts ranging from as little as about 10 wt.% to as much as about 99.9 wt.%.

The age of the ash is also a consideration in selecting the type of ash used in this invention. As lime-containing flyash gets older, a significant portion of its lime content converts to a slower reacting ingredient. This retards the setting process of the ash, often beyond the point where it is commercially useful. The preferred flyash constituent should therefore have sufficient CaO available to obtain an initial "green set" within a broad range of about 20–90 minutes. This provides sufficient "working time" for construction applications. One representative analysis of a western coal-derived flyash used in connection with this invention included about 38.9 wt.% silica, 27.5 wt.% lime, 23.9 wt.% alumina, 4.8 wt.% ferric oxide, 5.5 wt.% magnesium oxide, and 1.9 wt.% sulphur trioxide, with other minor constituents.

This invention may optionally employ cement as a minor ingredient in the binder composition, and not as the primary strength-contributing, ingredient. Portland cement, and especially the Type II or V variety, is the most desirable type of cement employed. Portland cement typically includes lime, silica, alumina, and ferric oxide, but in different amounts than that found in flyash. Whereas Portland cement normally contains about 65 wt.% lime, flyash generally contains about 5–35 wt.% lime depending upon what type of coal is employed by the power plant source. Generally, Portland cement will contain about 20% silica, whereas flyash can contain 20 to 60 wt.% silica, again depending upon the source of the coal. Another important point is that, while flyash additions to Portland cement in prior art compositions are generally limited to about 20 wt.%, the present invention contains much more flyash than cement.

Hydratable gypsum is also employed in connection with certain pozzolanic compositions of this invention. The alpha and beta calcium sulphate hemihydrate forms of gypsum are the most desirable, but optionally, calcium sulphate dihydrate and anhydrous forms can be used as additives in minor amounts. Calcium sulphate hemihydrate, also known as "stucco", gypsum hemihydrate, or calcined gypsum, typically sets by a hydraulic reaction in which the hemihydrate form takes on water modules to form a dihydrate. This reaction occurs relatively quickly, within about an hour, and the set gypsum composition obtains its full compressive strength. Flyash, on the other hand, obtains a minimum green strength within about 20 minutes, and thereafter ages to obtain its full compressive strength some days later.

The relationship between set gypsum and the pozzolanic reaction of flyash is a relatively complex one. One theory is that the set calcium sulphate dihydrate acts as an absorbent as the flyash ages. It is also believed to behave as an accelerator for the rate of hydration of the calcium silicates while retarding the rate of hydration for calcium aluminates. This unequal treatment of the constituents of the pozzolanic reaction by gypsum assures an even set throughout the solidified flyash composition. Additionally, the use of either alpha gypsum hemihydrate or beta gypsum hemihydrate, "molding plaster", does not effect the overall nature of the setting process. Either of these types of hydratable gypsum products can contribute to a high degree of early compressive strength in such applications as floor underlayments and road patches. This early green strength, achieved by using gypsum, is significantly greater than that expected for compositions containing flyash and cement alone. Gypsum hemihydrate can be added to the binder formulations of this invention in amounts ranging from about 10 wt.% to about 89 wt.%, depending upon the need for greater weather-resistance (promoted by low gypsum concentrations) or higher green strength (promoted by higher gypsum concentrations).

This invention also employs superplasticizers, also known as dispersants, which are known to reduce the amount of water necessary to form a sufficiently plastic mixture. There are a number of available dispersants which are based upon the condensation of an alkaline earth metal sulfonate and formaldehyde. A preferred dispersant is LOMAR D from Diamond Shamrock, which is used in amounts ranging up to about 2 wt.%, and more preferably within about 0.3–0.6 wt.%.

In an important aspect of this invention, setting retarders are employed for the flyash and gypsum hemihydrate constituents in order to provide a longer working time before set. This will permit the composition to be properly mixed and distributed to the application area of a job site or mold. Gypsum setting retarders are known to include sodium citrate and commercial proteinaceous retarders, such as Commercial Retarder available from National Gypsum, Fort Dodge, Iowa. The proteinaceous variety is more desirable, since it can be used in more liberal amounts without severely delaying the onset of the hydration reaction. Such commercial retarders are known to include lime, sodium hydroxide and animal-derived proteins.

In order to extend the initial setting reaction, as opposed to the aging, of the flyash, setting retarders are also provided for this constituent. Without a setting retarder, Class C flyash is known to set within about 20 minutes, a time widely-recognized as being too short for major construction jobs. Flyash retarders are known to include lime, lignosulfonate, and sugar-based retarders, glucose polymers, such as corn syrup or dextrin, polysaccharide, sorbitol, and natural sugar. The preferred flyash retarder of this invention is the salt of lignosulfonic acid, and especially LIGNOSITE, a commercial lignosulfonate-based retarder, which is preferably used in amounts ranging from 0 to about 0.2 wt.% of the dry ingredients.

When the above ingredients are employed in the preferred underlayment formulations of this invention, it is expected that approximately equal parts of Class C flyash and gypsum hemihydrate would be desirable, with minor amounts of lignosulfonate, commercial proteinaceous retarder and dispersant being employed to provide sufficient working time and a lower water demand. Preferred broad and narrow ranges for the floor underlayment binder compositions are disclosed below in Table I.

TABLE I

Floor Underlayment Binder Formulations

| Ingredient | Board Range (wt. %) | Narrow Range (wt. %) |
| --- | --- | --- |
| Class C Flyash | 10–89 | 45–54 |
| Hemihydrate Gypsum | 10–89 | 45–54 |
| Lignosulfonate | up to 0.2 | .01–.09 |
| Proteinaceous Retarder | up to 0.15 | .001–.009 |
| Dispersant | up to 2.0 | .1–.9 |

For road patch applications, a larger amount of flyash is desirable, since the patching compound must be more resistant to weathering, and should have high compressive strength after aging. Although gypsum may be omitted entirely from road patch formulations, it is desirable that gypsum hemihydrate be added as a minor ingredient for providing sufficient initial green strength to the patch after it has been applied to a road surface. Preferred road patch formulations are described below in Table II.

TABLE II

Road Patch Binder Formulations

| Ingredient | Broad Range (wt. %) | Narrow Range (wt. %) |
| --- | --- | --- |
| Class C Flyash | 40–89 | 55–64 |
| Gypsum Hemihydrate | 10–59 | 35–44 |
| Lignosulfonate | up to 0.2 | .01–.09 |
| Proteinaceous Retarder | up to 0.15 | .001–.009 |
| Dispersant | up to 2.0 | .1–.9 |

The exterior or statuary compositions of this invention desirably include Class C flyash as a major constituent, and optionally, up to about 10 wt.% cement and/or about 0.1–2 wt.% pigment to provide a cementitious appearance. Such compositions also include about 0–0.2 wt.% lignosulfonate for obtaining a desired 30–50 minute set. One preferred statuary composition includes 90 wt.% Class C flyash having about 2–5% lime, 0.07 wt.% lignosulfonate, and up to about 5 wt.% cement. Another preferred composition includes about 99 wt.% Class C flyash, 0.07 wt.% lignosulfonate, and about 0.05 wt.% black pigment. If the statuary composition includes cement, it is known that the cement will not have a significant impact on the overall strength, but will contribute to a cementitious appearance, much like the addition of a black pigment.

All of the above formulations can also include, in exchange for part of the flyash or gypsum binder, polymers and rubbers in amounts ranging up to about 30 wt.% of the solid ingredients. One particularly important additive, which is receiving the attention of many state legislatures, is recycled tires which have been pulverized into small particles or fibers of 1 cm or less.

The binder elements of the above compositions can also be substituted with light-weight filler material up to about 30 wt.% of the total weight of the solids to help reduce the weight of the mixture and the density of the product made from the mixture. Suitable light-weight fillers include vermiculite, expanded perlite, pulverized fuel ash floaters, and the like.

The formulations of this invention also may contain fibrous reinforcing material up to about 30 wt.% of the solids. Such fibers may contain organic and inorganic constituents, such as glass fibers, mineral wool, slag wool fibers, rock wool fibers, ceramic fibers, aluminum fibers, silica-alumina fibers, alumina silicate fibers, and other types of metal-based fibers. The organic fibers may include cellulose fibers, such as paper pulp, polyamide fibers, such as nylon and KEVLAR, polyester fibers, polyolefin fibers, polypropylene fibers, carbon and graphite fibers, viscose fibers, jute fibers, flax, cotton, straw, grass, sisal, hemp, and bamboo, etc. The fibrous constituents will improve the tensile strength, impact resistant, and screw-holding value of the set material, and in certain cases can make it more fire-resistant. Filler materials can also be used in amounts up to about 30% of the total weight of dry ingredients. Such fillers can include perlite, mica, pulverized fuel ash, fillite, zeospheres, and clay, etc.

The above binder compositions and optional additives are typically mixed with about 25–250 wt.% sand based upon the weight of the binder. One preferred binder-sand mixture includes 1.25:1 binder to sand ratio, wherein the sand contains #20 or #30 grade multi-purpose 20-30-40 silica. To these dry mixtures, can be added sufficient amounts of water to provide a flowing slurry. Depending upon the moisture content of the sand, the water content can range from about 25% to about 80% of the total weight of binder, sand, and the water. A preferred underlayment composition having about a 50–70 minute vicat set time is included below in Table III.

TABLE III

Floor Underlayment Mixture 80 lbs. LEVEL RIGHT[1]
100 lbs. Silica Sand
2.5–2.75 Gallons of Water

[1]LEVEL RIGHT is a commercial version of the underlayment setting composition of this invention which includes about 49.96% Class C flyash, 49.96% DENSCAL alpha hemihydrate, .07% LIGNOSITE, and about .01 wt. % commercial retarder.

The commercial embodiment of this invention, LEVEL RIGHT distributed by Gyp-Crete Corporation has achieved substantial commercial success in the self-levelling business. It has eliminated the need for surface preparation, avoided the problems of difficult-to-maintain water to cement ratios of prior art Portland cement underlayment compositions, and is less sensitive to hot and cold weather pumping. This composition is known to yield approximately at least about 100, and preferably about 150 square feet at $\frac{1}{8}$ inch thickness, about 75 square feet at $\frac{1}{4}$ inch thickness, about 38 square feet at $\frac{1}{2}$ inch thickness, about 25 square feet at 0.75 inch thickness, and about 19 square feet at 1 inch thickness. The composition can be used in thicknesses exceeding 1 inch without the addition of gravel aggregate.

EXAMPLE I

Preferred compositions for this invention were developed by mixing various combinations of molding plaster, cement, Class C flyash, alpha hemihydrate, and various other additives together with a sufficient amount of water to provide a flowable mixture. Selected examples of these compositions are listed below in Table IV.

TABLE IV

Experimental Compositions

| Sample Numbers | Molding Plaster | Type II Portland Cement (wt. %)[2] | LOMAR D (wt. %) | Flyash Class C (wt. %)[2] (different lime-containing sources) | DENSCAL (wt. %)[2] | LIGNO-SITE (wt. %) | Proteinaceous Retarder (wt. %) | Dye (Black) (wt. %) | Density (1 hr. after set) (lb/ft$^3$) | Compressive Strength[3] (1 hr. after set) (psi) | Normal Consistency (ml) |
|---|---|---|---|---|---|---|---|---|---|---|---|
| 1 |  |  | 0.1 | 50 | 50 | .20 |  |  | 123.3 | 1,665 | 22.4 |
| 2 |  | 5 | 0.1 | 45 | 50 | .08 |  |  | 123.3 | 2,670 | 25.2 |
| 3 |  | 10 | 0.1 | 40 | 40 | .08 |  |  | 124.6 | 1,585 | 25.6 |
| 4 |  |  |  | 100 |  |  |  |  | 127.6 | 1,795 | 22.3 |
| 5 |  |  | .03 | 50 | 50 | .05 | .02 | .03 | 123.8 | 1,845 | 25.7 |
| 6 |  |  | .03 | 50 | 50 | .05 |  | .05 | 123.4 | 2,450 | 25.7 |
| 7 |  |  | .10 | 50 | 50 | .05 |  | .05 | 124.7 | 2,875 | 25 |
| 8 |  |  | .3 | 60 | 40 | .05 |  | .05 | 126.1 | 2,335 | 22 |
| 9 |  | 40 | .3 | 60 |  | .05 |  |  | 132 | 135 | 22 |
| 10 | 23.5 |  | .2 | 52 | 23.5 | .05 | .01 | .20 | 123.2[1] | 2,410[1] | 25 |
| 11 |  |  | .2 | 52 | 47.75 | .05 |  |  | 122 | 2,400 | 25.3 |
| 12 |  | 5 | .2 | 47 | 47.75 | .05 |  |  | 123.5 | 1,700 | 25.3 |

[1] 1.5 hours after set
[2] rounded up to nearest whole wt. %
[3] ± 500 psi experimental error The normal consistency of each mixture was then measured in accordance with ASTM C-472, part 15. Each of the compositions was then poured into a 2 inch cube mold and allowed to set. The now hardened composition was removed from the cube mold and the density for all the samples was measured 1 hour after set. The hard cubes were then placed into a RIEHLE compression testing machine, manufactured by American Machine Metals, Inc. This machine had a 60,000 pound force maximum capacity. The compressive load for each of the samples was measured and then the compressive strength in pounds per square inch (psi) was calculated based upon the surface area cross-section of each cube.

Although this invention is not committed to any particular theory, various trends can be noted through a comparison of these experimental compositions. For example, lowering the LIGNOSITE flyash retarder from 0.2 to 0.08 wt.% appeared to increase the compressive strength in Sample 2 as compared to Sample 1, but substituting 10% of the DENSCAL alpha hemihydrate for Portland Type II cement, appeared to reduce the compressive strength of Sample 3 as compared to Sample 2. These trends are thought to be explained by the fact that lignosulfonate tends to delay the setting of the Class C flyash, so that it does not develop a large amount of green compressive strength. The substitution of cement for gypsum hemihydrate also affects the initial green strength of the set composition, since cement is known to take up to 24 hours to provide a full set, while gypsum hemihydrate is known to obtain at least 75–90% of its full compressive green strength within about 1 hour.

Another interesting comparison is the lower green compressive strength available by employing Class C flyash alone. This is demonstrated by comparing Sample 4 with Sample 2. Class C flyash, like Portland cement, has a lower green strength than set gypsum, and achieves most of its strength after a period of aging.

In comparing Samples 5 and 6, it is noted that the addition of a proteinaceous retarder appeared to lower the initial green compressive strength of a 50/50 flyash gypsum composition. This is an expected trend, since the retarder is likely to slow down the hydraulic setting reaction of the gypsum hemihydrate to form dihydrate. A comparison of Samples 6 and 7 reveals that, with more additions of the LOMAR D dispersant, less water was available to the hydraulic gypsum reaction, as measured by the lower normal consistency, and a stronger arrangement of gypsum crystals formed. Gypsum, unlike flyash, significantly depends upon the nature of the crystal formation for its strength. If the setting time of the hydration reaction extends significantly over 90 minutes through the addition of too much water or too much retarder, the resulting gypsum crystals are too small to provide significant strength. Therefore, it is desirable that the amount of water, LOMAR D dispersant, and commercial retarder be carefully measured to provide a setting time for the gypsum constituent of about 20–90 minutes.

Another interesting observation is revealed in the comparison of Samples 8 and 9. When all of the DENSCAL alpha hemihydrate was substituted with Portland Type II cement, the green compressive strength of Sample 9 appeared to fall significantly below that for Sample 8. Again, this can be attributed to the relatively high green strength of set gypsum, as compared to the green strength obtained for cement and Class C flyash alone. The value of having a high initial green strength cannot be understated, since it is this property that permits the floor underlayment, road patch, or statuary to be handled or used in the shortest possible period of time.

The addition of beta hemihydrate molding plaster, on the other hand, as evidenced by Sample 10, did not appear to significantly detract from the initial green compressive strength of the composition. It is understood that both alpha and beta hemihydrate can be used interchangeably without significantly impacting the properties of the resulting set product, although alpha hemihydrate is preferred from a commercial perspective.

The impact of cement is further demonstrated in a comparison of Samples 11 and 12. As these samples demonstrate, a replacement of as little as 5% of the Class C flyash with Portland Type II cement, has an apparent negative impact on the green compressive strength of the resulting set composition.

EXAMPLE II

Samples 13–20 in Table V below are directed to exterior cementitious and statuary compositions composed significantly of Class C flyash. These samples were prepared and tested in accordance with the procedures provided in Example I.

TABLE V

Experimental Compositions

| Sample Numbers | Type II Portland Cement (wt. %)[4] | LOMAR D (wt. %) | Flyash Class C (wt. %)[1] (different lime-containing sources) | DENSCAL (wt. %)[1] | LIGNO-SITE (wt. %) | Lime | Dye (Black) (wt. %) | Density (1 hr. after set) (lb/ft$^3$) | Compressive Strength[4] (1 hr. after set) (psi) | Normal Consistency (ml) | Zeospheres (Flyash Class F Filler) | Perlite |
|---|---|---|---|---|---|---|---|---|---|---|---|---|
| 13 | | .3 | 99 | | .07 | .5 | .07 | 131.0 | 1,440 | 17.3 | | |
| 14 | | .3 | 84 | 15 | .07 | .5 | .07 | 131.7 | 1,260 | 18.7 | | |
| 15 | | .3 | 99 | | .07 | .5 | .07 | 131.3[2] | 2,295[2] | 18.7 | | |
| 16 | | .3 | 98 | | .07 | 2 | .07 | 130.1[2] | 2,135[2] | 18.7 | | |
| 17 | 5 | .4 | 95 | | .07 | | .07 | 132.7[3] | 1,400[3] | 18 | | |
| 18 | | .33 | 75 | | | | | 122.3 | 665 | 20 | 25 | |
| 19 | | .35 | 98 | | | | | 114.0 | 660 | 20 | | 2 |
| 20 | | .35 | 100 | | | | | 129.6 | 760 | 20 | | |

[1] rounded up to the nearest whole wt. %
[2] 66 hours after set
[3] 17 hours after set
[4] ± 500 psi experimental error It was initially noted, that the addition of as much as about 15 wt.% DENSCAL alpha hemihydrate did not appear to significantly improve the green compressive strength performance of Sample 14, as compared to Sample 13. In fact, it appears to have had a slightly negative effect on the compressive strength after set.

In order to establish whether the amount of free lime in the composition affected the compressive strength, Samples 15 and 16 were prepared. It appears that the amount of free lime added to the composition had very little effect on the resulting green compressive strength, but the addition of as little as 5 wt.% of Portland cement appeared to significantly decreased the compressive strength, even after 17 hours of aging, as illustrated by Sample 17.

Samples 18-20 experimented with various aggregates in order to assess the effect of these additives upon the green compressive strength of set experimental compositions. It was demonstrated that the addition of 1-2 micron-sized, Class F flyash zeospheres and perlite did not seriously effect the compressive strength, but did significantly lower the density of the set composition. The use of perlite is especially attractive, since it can result in lighter weight statuary, as well as other set products, such as boards, pottery, molding, flooring, roofing, insulation, fireproofing, and the like.

From the foregoing, it can be realized that this invention provides improved flyash-containing and flyash-based compositions suitable for interior and exterior applications. The described compositions have obtained the advantages of less cracking, less shrinkage, and greater feathering and deep fill thicknesses than cement. They are also less susceptible to extreme weather conditions, and do not require surface treatment prior to their application to an underlying substrate. Although various embodiments have been illustrated, this was for the purpose of describing, and not limiting the invention. Various modifications, which will become apparent to one skilled in the art, are within the scope of this invention described in the attached claims.

What is claimed is:

1. A binder composition comprising about 10-89 wt.% of a Class C flyash, about 10-89 wt.% gypsum hemihydrate, and at least about 0.05 wt.% of an additive selected from: a setting retarder, dispersant, or pigment, said composition capable of setting when mixed with sufficient water to form a hardened material in less than about 90 minutes, said hardened material having a compressive strength of at least about 1,000 psi after about 1 hour after set.

2. The binder composition of claim 1, wherein said Class C flyash comprises at least about 6-30 wt.% CaO.

3. The binder composition of claim 2 consisting essentially of said Class C flyash and gypsum hemihydrate, and less than about 1% of said additive.

4. The binder composition of claim 1 comprising about 45-54 wt.% Class C flyash, about 45-54 wt.% gypsum hemihydrate, and at least about 0.01 wt.% flyash setting retarder.

5. The binder composition of claim 1, wherein sufficient setting retarder is introduced into the composition so that it has at least about 20 minutes of working time prior to setting.

6. The binder composition of claim 5, wherein said setting retarder comprises a gypsum setting retarder and a flyash setting retarder.

7. The binder composition of claim 1 further comprising up to about 30 wt.% of a filler.

8. The binder composition of claim 1 consisting essentially of approximately equal parts of Class C flyash and gypsum hemihydrate, and up to about 0.2 wt.% lignosulfonate, up to about 0.15 wt.% setting retarder, and up to about 2 wt.% dispersant.

9. The binder composition of claim 1 having a setting time of about 20-90 minutes and capable of being applied in thicknesses exceeding about 1 inch without the addition of an aggregate.

10. A floor underlayment mixture comprising the binder composition of claim 1 along with sand and sufficient water to form a flowable mixture.

11. A floor underlayment binder composition comprising about 45-54 wt% Class C flyash, about 45-54 wt.% gypsum hemihydrate, about 0.01-0.09 gypsum retarder, about 0.001-0.009 flyash retarder, and about 1-0.9 dispersant, said underlayment binder composition capable of setting when mixed with sufficient water in about 20-90 minutes to form a hardened material having a green compressive strength of at least about 1,000 psi about 1 hour after set.

12. A floor underlayment binder composition of claim 11 comprising about 45-54 wt.% Class C flyash, about 45-54 wt.% gypsum hemihydrate, about 0.01-0.09 wt.% lignosulfonate, about 0.001-0.009 setting retarder, and about 0.1-0.9 dispersant.

13. The floor underlayment binder composition of claim 11 further comprising up to abut 0.2 wt.% lignosulfonate, up to about 0.15 wt.% setting retarder, and up to about 2.0 wt.% dispersant, the sum of said ingredients being at least about 0.05 wt.% of the total underlayment binder composition.

14. The floor underlayment binder composition of claim 11 having a green compressive strength of at least about 2,000 psi about 1 hour after set.

15. The floor underlayment binder composition of claim 11 comprising approximately equal parts of Class C flyash and gypsum hemihydrate.

16. The floor underlayment binder composition of claim 11 comprising not more than about 10 wt.% cement.

17. The floor underlayment binder composition of claim 11, wherein said composition exhibits no substantial shrinkage following set.

18. A shrink-resistant, cementitious floor underlayment mixture comprising:
 a binder composition including 10–89 wt.% Class C flyash, 10–89 wt.% gypsum hemihydrate, and at least about 0.05 wt.% of an additive selected from: a setting retarder, dispersant, or pigment;
 sand; and
 sufficient water to form a flowable mixture; said mixture capable of being applied in thicknesses exceeding about 1 inch without substantial shrinkage during setting.

19. The underlayment mixture of claim 18 comprising sufficient binder and sand to provide a yield of at least about 100 sq. ft. at about ⅛ inch thickness.

20. The underlayment mixture of claim 19, wherein said mixture can be provided in thicknesses exceeding 1 inch without the addition of an aggregate.

21. The cementitious floor underlayment mixture of claim 18, wherein said binder composition comprises at least about 45 wt.% Class C flyash and at least about 0.01 wt.% flyash retarder.

22. A road patch binder composition comprising about 40–89 wt.% Class C flyash, about 10–59 wt.% gypsum hemihydrate, and at least about 0.05 wt.% of an additive selected from: a setting retarder, dispersant, or pigment; said composition capable of setting in about 20–90 minutes when mixed with sufficient water, and sets to form a hardened material having a compressive strength of at least about 1,000 psi about 1 hour after set.

23. The road patch binder composition of claim 22 comprising about 55–64 wt.% Class C flyash, 35–44 wt.% gypsum hemihydrate, 0.01–0.09 wt.% flyash retarder, 0.001–0.009 wt.% gypsum retarder, and about 0.1–0.9 wt.% dispersant.

24. The road patch binder composition of claim 22 comprising not more than about 44 wt.% gypsum hemihydrate.

25. An exterior cementitious composition comprising about 90–99.9 wt.% of a Class C flyash, and about 0.1–10 wt.% of an additive selected from: a setting retarder, dispersant, pigment, cement, or filler; said composition having a compressive strength of at least about 600 psi about 1 hour after set, and exhibiting a cementitious appearance.

26. The road patch composition of claim 25 comprising about 99 wt.% Class C flyash and sufficient flyash retarder to provide about 30–50 minutes of setting time.

27. The exterior cementitious composition of claim 25 comprising at least about 0.1 wt.% black pigment.

28. A shrink-resistant cementitious composition comprising:
 at least about 89 wt.% of a binder-containing Class C flyash;
 gypsum hemihydrate; and
 less than about 11 wt.% of a setting retarder;
 less than about 11 wt.% of dispersant;
 less than about 11 wt.% of pigment; and
 less than about 11 wt.% of fibrous reinforcing material, said composition forming a hardened material having a green compressive strength of at least about 600 psi when mixed with sufficient water and permitted to set, said setting occurring without substantial shrinkage.

* * * * *

UNITED STATES PATENT AND TRADEMARK OFFICE
CERTIFICATE OF CORRECTION

PATENT NO. : 5,439,518
DATED : August 8, 1995
INVENTOR(S) : Hubert C. Francis and Anne H. Ksionzyk It is certified that error appears in the above-indentified patent and that said Letters Patent is hereby corrected as shown below:

Column 3, line 58, after "strength", but before the period, insert --after hydration is complete--.

Signed and Sealed this

Eleventh Day of March, 1997

*Attest:*

BRUCE LEHMAN

*Attesting Officer*  Commissioner of Patents and Trademarks